United States Patent [19]
Berg et al.

[11] 3,917,322
[45] Nov. 4, 1975

[54] JOINT STRUCTURE FOR CLAMSHELL BUCKET ASSEMBLY

[75] Inventors: Lawrance F. Berg, Lockport; Theodore B. Hogg, Aurora; Robert W. Lichti, Oswego, all of Ill.

[73] Assignee: Caterpillar Tractor Company, Peoria, Ill.

[22] Filed: Mar. 29, 1974

[21] Appl. No.: 456,241

Related U.S. Application Data
[62] Division of Ser. No. 283,818, Aug. 25, 1972, Pat. No. 3,873,133.

[52] U.S. Cl. ............... 285/136; 37/183 R; 285/190; 285/282; 403/359
[51] Int. Cl.² ................ F16L 39/04; E02F 3/44
[58] Field of Search ............. 37/182–188; 285/136, 190; 403/359; 285/282

[56] References Cited
UNITED STATES PATENTS

| | | | |
|---|---|---|---|
| 1,155,582 | 10/1915 | Kelly | 403/359 X |
| 1,483,865 | 2/1924 | Bowen | 403/359 X |
| 2,343,491 | 3/1944 | Bard et al. | 285/136 |
| 3,481,640 | 12/1969 | Guinot | 37/182 X |

FOREIGN PATENTS OR APPLICATIONS

| | | | |
|---|---|---|---|
| 343,969 | 2/1960 | Switzerland | 285/190 |

*Primary Examiner*—Clifford D. Crowder
*Attorney, Agent, or Firm*—Phillips, Moore, Weissenberger, Lempio & Strabala

[57] ABSTRACT

A clamshell bucket assembly includes a joint which allows free rotation of the bucket through 360°, meanwhile providing that fluid pressure may pass through the joint to one or the other side of a cylinder for opening and closing the bucket, irrespective of the rotative position of the bucket. The joint includes a tubular member and a shaft rotatable within the tubular member, and a fixed frame is included for generally fixing the tubular member in position relative to such frame.

3 Claims, 8 Drawing Figures

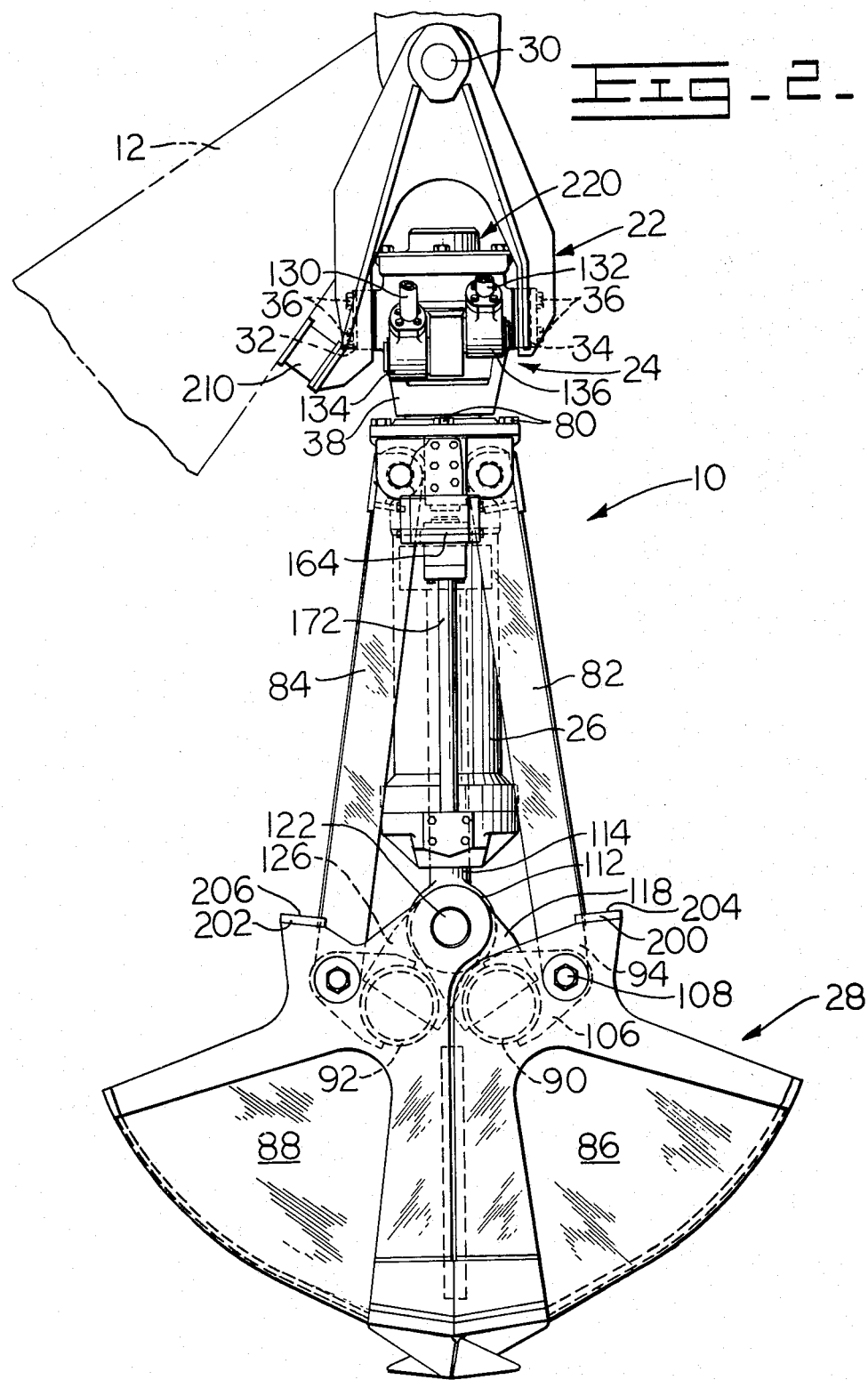

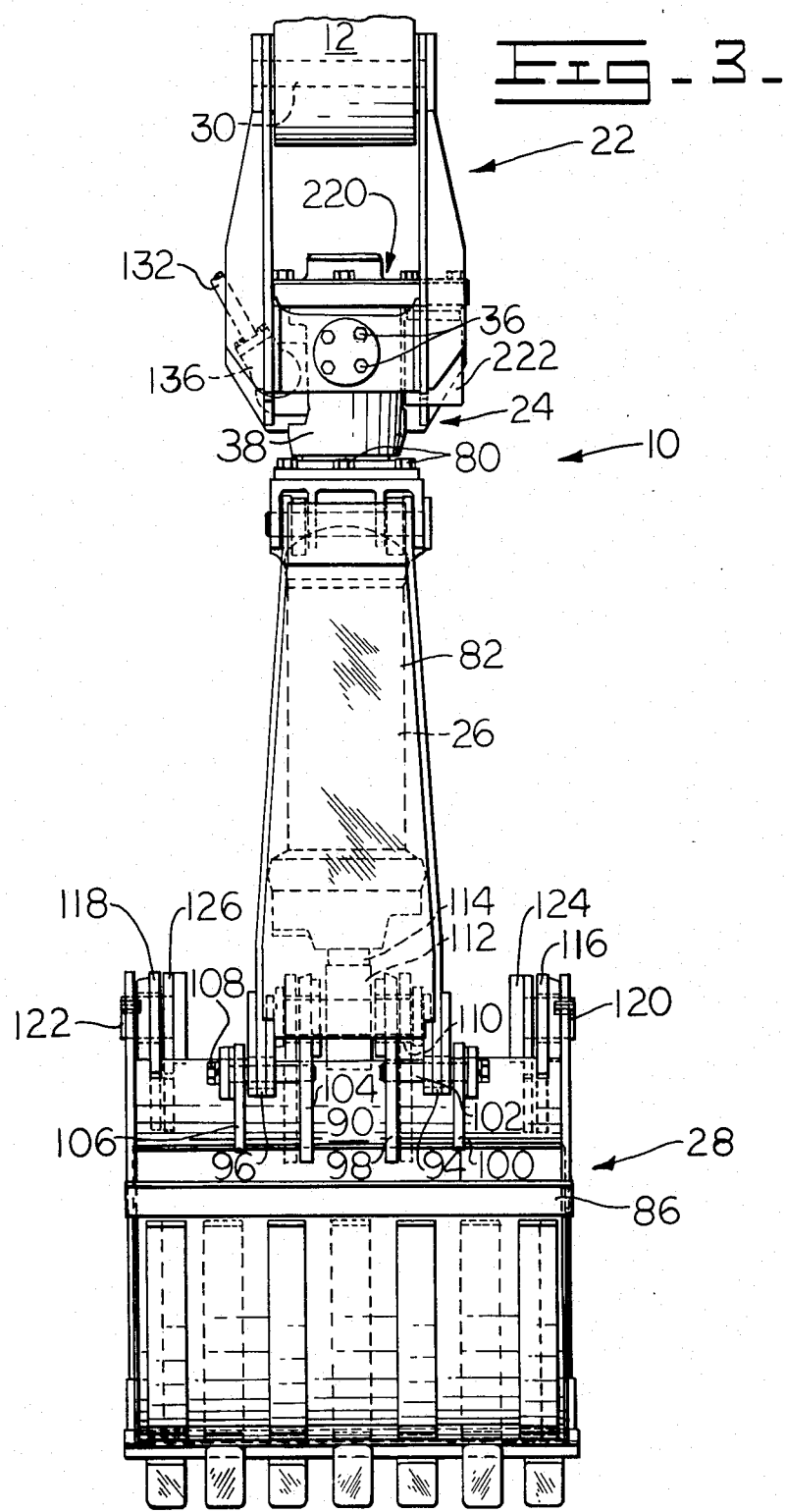

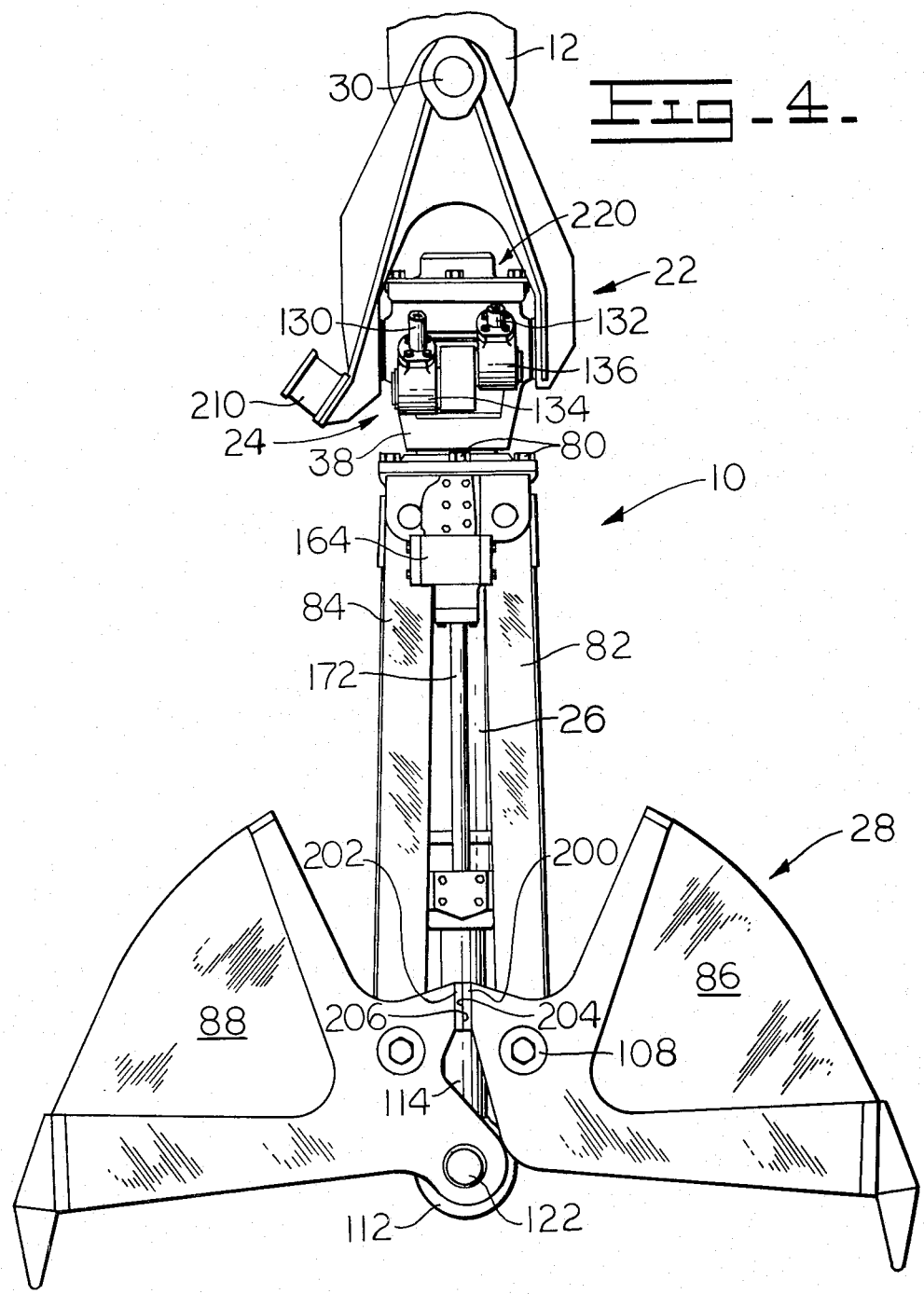

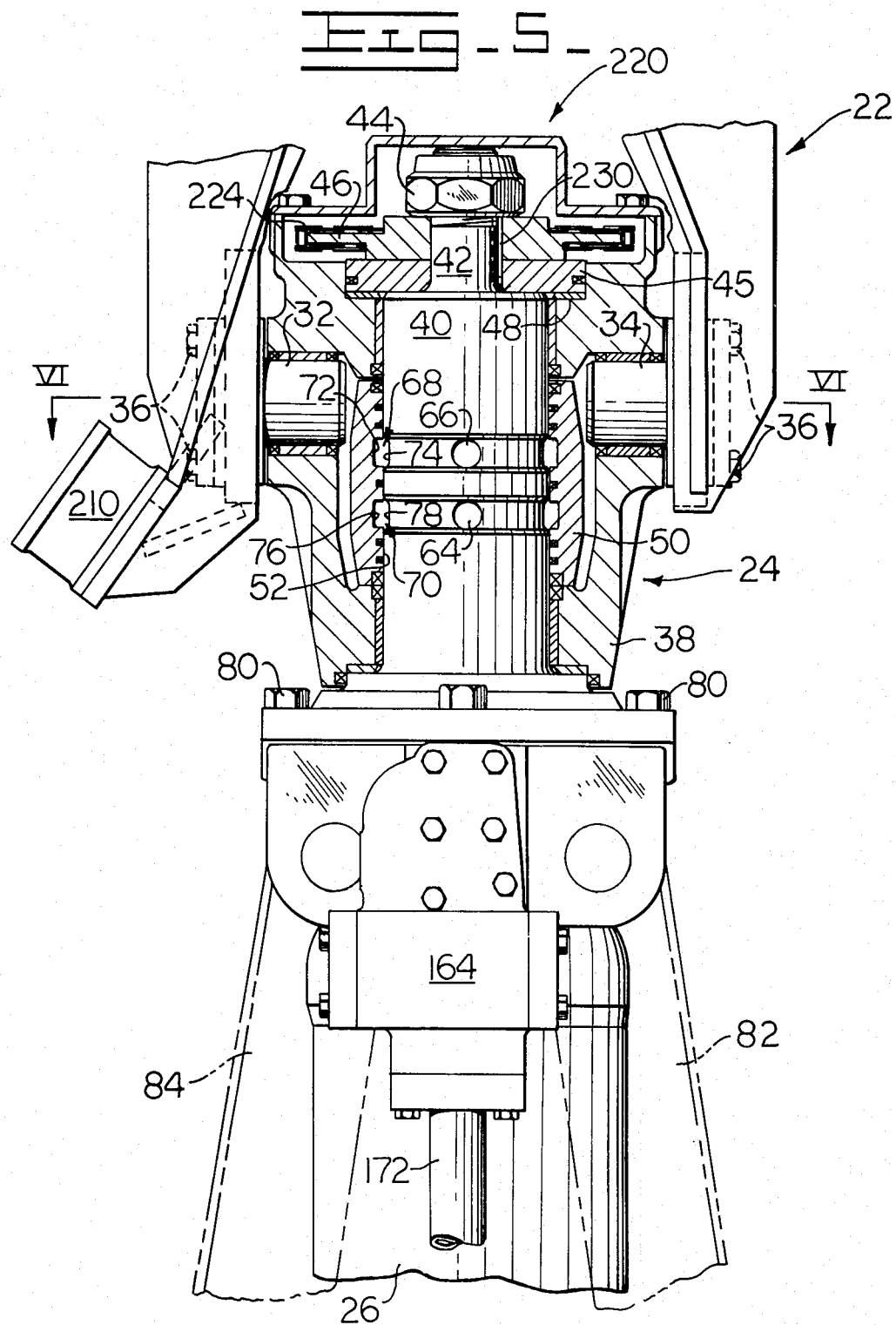

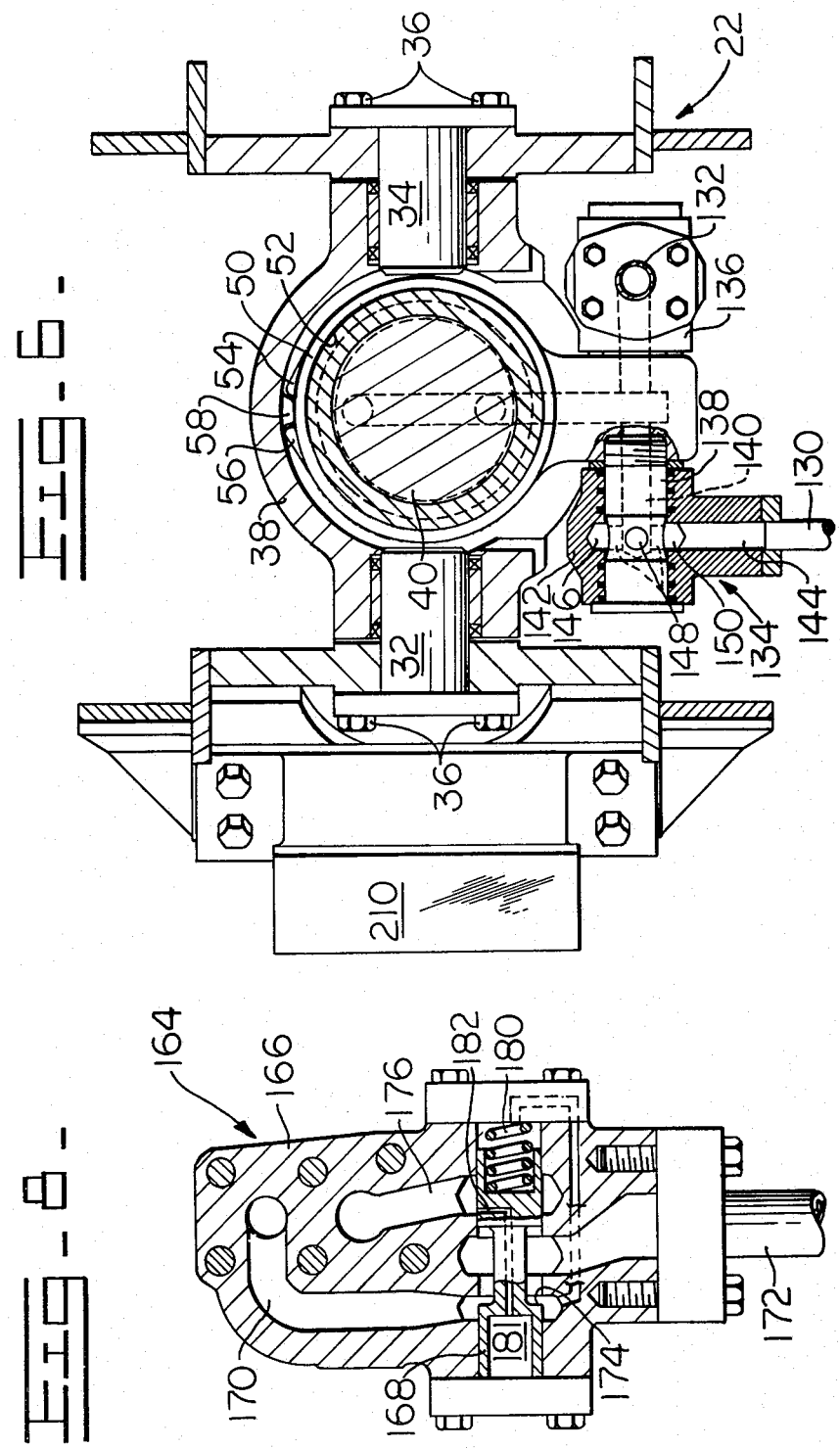

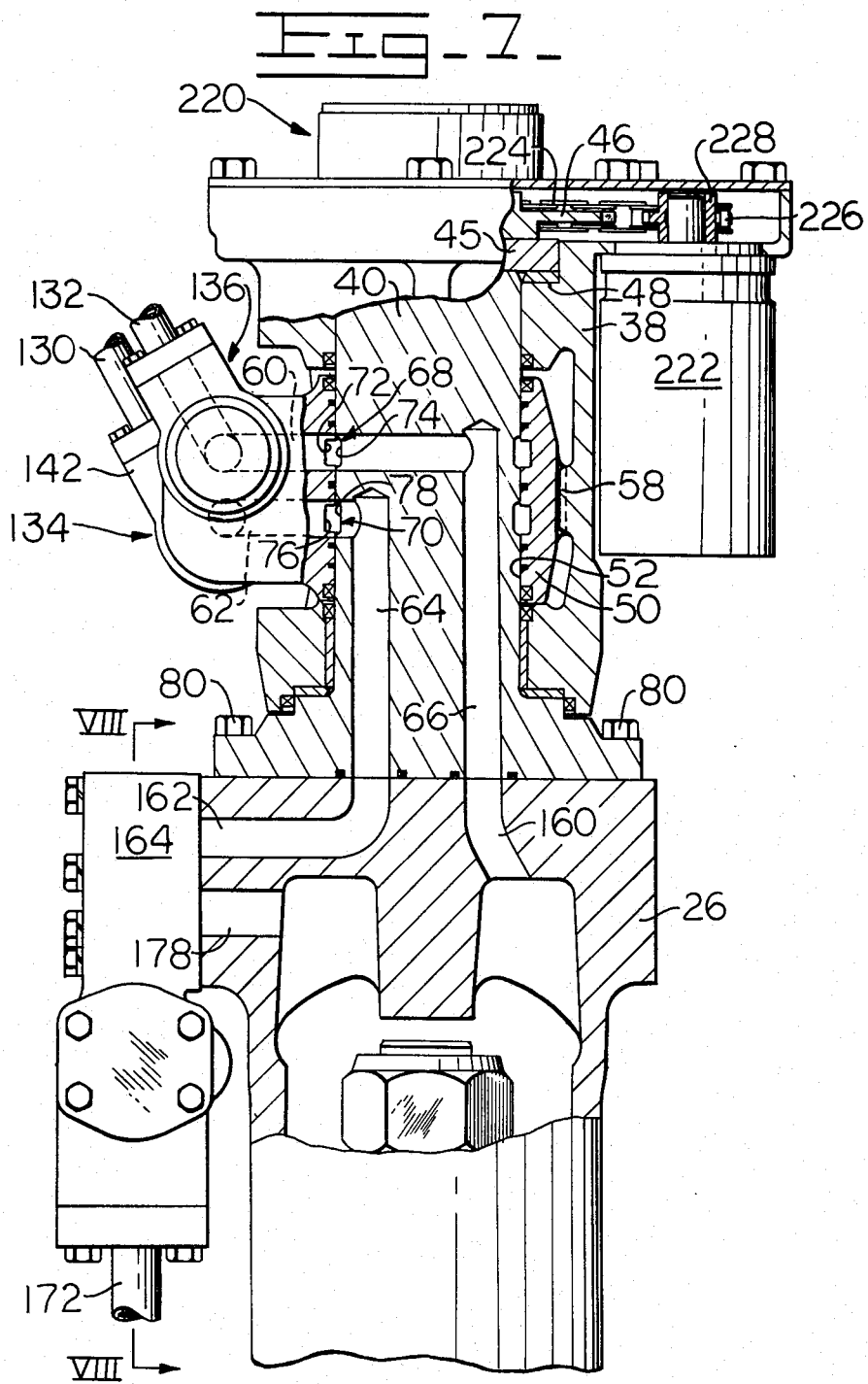

JOINT STRUCTURE FOR CLAMSHELL BUCKET ASSEMBLY

This is a division of Ser. No. 283,818, filed Aug. 25, 1972, now U.S. Pat. No. 3,873,133.

BACKGROUND OF THE INVENTION

This invention relates to bucket assemblies, and more particularly, to a bucket assembly which is freely pivotable through 360°.

In general, excavators which provide as part of a bucket assembly a cylinder-operated bucket are well known. In such systems, application of fluid pressure to one or the other end of the cylinder opens and closes the jaws of the bucket. With the realization of the advantage of pivoting the bucket about a vertical axis, such advantage being well known, various means have been employed for allowing such pivoting. See, for example, U.S. Pat. No. 2,725,996 to Britton, U.S. Pat. No. 2,837,846 to Long, U.S. Pat. No. 3,330,056 to Woodside et al., U.S. Pat. No. 3,413,029 to Donovan, U.S. Pat. No. 3,451,150 to Pitaval, U.S. Pat. No. 3,462,029 to Mork, U.S. Pat. No. 3,493,135 to Novotny, U.S. Pat. No. 3,510,018 to Mork et al., and U.S. Pat. No. 3,517,960 to Mork et al. The designs disclosed in U.S. Pat. Nos. 2,725,996 (Britton), 2,837,846 (Long), 3,330,056 (Woodside et al.), 3,462,029 (Mork), 3,493,135 (Novotny), 3,510,018 (Mork et al.), and 3,517,960 (Mork et al.), however, cannot be said to allow free pivoting of the bucket since, in each case, the body of the cylinder and the hoses attached thereto (for supplying pressurized fluid to the cylinder) rotate with the bucket. The hoses, of course, by their very nature, do not allow free rotation of the bucket.

U.S. Pat. Nos. 3,413,029 to Donovan and 3,451,150 to Pitaval do provide means where such hoses do not interfere with such pivoting. However, in the Donovan apparatus, the means provided, being positioned adjacent the cylinder area of the apparatus, are not conveniently associated with the cylinders provided, but must communicate therewith through a plurality of hoses. And the device of Pitaval depends on pivoting of the piston within a cylinder, with the sealing problems attendant thereto.

In addition, of course, it sometimes is necessary to move or pivot to an extent the complete bucket assembly, as contrasted with the bucket itself. In such case, even though it is desirable to provide that the hoses are free of the pivoting of the bucket, they may well be designed to move with the whole bucket assembly. In such case, it would be desirable to allow a certain degree of pivoting of the hose ends relative to the bucket assembly as a whole.

Furthermore, such movement of the bucket assembly is generally relative to the arm which is part of the excavating machine and which supports the complete bucket assembly. Such movement may in some cases bring the bucket assembly quite close to or in contact with the arm, with possible damage to the assembly. It would be advantageous, therefore, to provide safety means for preventing such damage.

In the past, it has also been found desirable to open the jaws of the bucket as quickly as possible. Achieving the response desired has been in the past difficult because of the relatively great bulk of the jaws. It would certainly be advantageous to provide means for opening the jaws in an extremely rapid manner, meanwhile with such means being extremely simple and effective, without the necessity of complicated external hoses and the like.

In addition to the quick-opening feature, positive stop means associated only with the jaws of the bucket for determining the fully opened position would be advantageous. This would protect from damage the cylinder structure and linkages used for opening and closing the jaws. In combination with the quick-opening feature, such stop means for determining the fully opened position would come into play quite suddenly, providing the advantage of aiding in the cleaning of the jaws upon such opening thereof.

While additional U.S. Pat. Nos. 2,188,672 to Atkinson and 2,605,563 to Browning may be of general interest in these contexts, a study of them reveals that they do not add anything pertinent to this subject matter.

SUMMARY OF THE INVENTION

It is therefore an object of this invention to provide, in an excavating machine having an arm which supports a bucket assembly including a cylinder, means which insure that the bucket is freely pivotable through 360° without the cylinder hoses thereof hindering such pivoting, the means for allowing such pivoting being simple in design and efficient in use.

It is a further object of this invention to provide, in an excavating machine, means which, while fulfilling the above object, provide that the hoses for providing fluid pressure to the cylinder are pivotable to an extent relative to the bucket assembly.

It is a still further object of this invention to provide, in an excavating machine, means which, while fulfilling the above objects, provide that movement between the arm and bucket assembly does not damage the bucket assembly.

It is a still further object of this invention to provide, in an excavating machine, means which, while fulfilling the above objects, open the jaws of the bucket as quickly as possible.

It is a still further object of this invention to provide, in an excavating machine, means which, while fulfilling the above objects, provide stop means for determining the fully opened position of the jaws.

Broadly stated, disclosed herein is a joint assembly comprising a tubular member generally fixed in position and defining a longitudinal bore and a lateral tubular member passage through the body thereof. A longitudinal shaft is disposed within the bore of the tubular member with the outer surface thereof in intimate relation with the inner surface of the tubular member, and rotatable about its longitudinal axis within the tubular member, and defining through the shaft body a shaft passage. An annular passage is defined between the inner surface of the tubular member and the outer surface of the shaft, providing continuous communication therethrough of the tubular member passage and the shaft passage, irrespective of the rotative position of the shaft relative to the tubular member. In addition, there is further included a hose defining an internal passage, and a coupling interconnecting the hose end and the tubular member, said coupling comprising means for providing a degree of movement of the hose end relative to the tubular member, meanwhile providing continuous communication of the hose internal passage with the tubular memeber passage.

In combination with a fluid pressure source actuating a cylinder the rod of which is movable to first and second positions by application of fluid under pressure to one and the other end of the cylinder, means are included for selectively applying fluid pressure from the source to the one end of the cylinder. Valve means are provided for directing fluid pressure from the source to the other end of the cylinder, the valve means cutting off fluid pressure to the other end of the cylinder upon application of fluid pressure to the one end of the cylinder at substantially the same time as such application of fluid pressure to the one end of the cylinder, and allowing communication between the other end of the cylinder and the one end of the cylinder so that the fluid flow from the other end of the cylinder aids the fluid flow directed to the one end of the cylinder.

In apparatus including a bucket comprising a pair of openable and closable jaws, and means for opening and closing the jaws, stop means are associated with the jaws, said stop means comprising a pair of stop members, one associated with each jaw, the stop members being positioned to contact each other to limit the opening movement of the jaws.

In apparatus including an arm, an implement and means pivotally attached to the arm and interconnecting the arms and the implement to support the implement, cushion stop means are associated with the arm and means pivotally attached to the arm for limiting the pivoting of the means pivotally attached to the arm in the direction of the arm.

BRIEF DESCRIPTION OF THE DRAWINGS

These and other objects of the invention will become apparent from a study of the following specification and drawings, in which:

FIG. 2 is an enlarged side elevational view of the clamshell bucket assembly with the bucket in the closed position;

FIG. 3 is an enlarged front elevational view of the clamshell bucket assembly;

FIG. 4 is an enlarged side elevational view of the clamshell bucket assembly with the bucket in a fully opened position;

FIG. 5 is an enlarged side view, partially in section, of the upper portion of the clamshell bucket assembly, and showing the hydraulic change valve and details of the swivel joint;

FIG. 6 is a cross-sectional view of the swivel joint taken along the line VI—VI of FIG. 5;

FIG. 7 is a cross-sectional side view of the swivel joint and the outer portion of the hydraulic cylinder and further showing the hydraulic change valve; and, FIG. 8 is a cross-sectional view of the hydraulic quick change valve taken along the line VIII—VIII of FIG. 7.

DESCRIPTION OF THE PREFERRED EMBODIMENT

Figure 1:
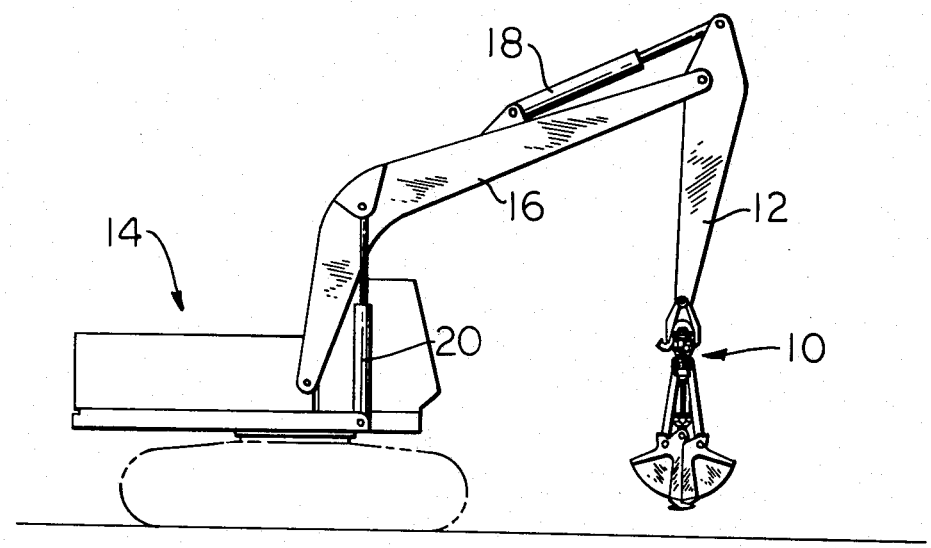
FIG. 1 is a side elevational view of a hydraulic excavating machine with the clamshell bucket assembly attached to the end of a stick arm.

Referring to FIG. 1, a clamshell bucket assembly, designated generally by the reference numeral 10, is shown attached to the end of a stick arm 12 of an excavating machine 14. The stick arm 12 is fastened to the end of a boom 16, and the movement of the stick arm 12 is controlled by a hydraulic cylinder 18 carried on boom 16. Movement of the boom 16 is controlled by a pair of hydraulic cylinders, one of which is shown at 20. The assembly 10 is shown in larger detail in FIGS. 2–4. Such assembly 10 includes a trunnion support assembly 22, a swivel joint assembly 24, a hydraulic cylinder 26, and an implement, bucket 28. Trunnion assembly 22 is pivotally fastened to stick arm 12 by means of pin 30, and the swivel joint assembly 24 is pivotally mounted to trunnion assembly 22 by means of pin and plate assemblies 32, 34 which fasten to the swivel joint assembly 24 by means of a plurality of capscrews 36. The pivotal planes determined by pin 30, and pin and plate assemblies 32, 34, it should be noticed, are perpendicular. The particular construction of pin and plate assemblies 32, 34 can be seen in FIGS. 5 and 6.

The swivel joint assembly 24 is shown in detail in FIGS. 5, 6 and 7. As shown therein, pin and plate assemblies 32, 34 support a fixed joint frame 38, A longitudinal shaft 40 is disposed within the frame 38, the upper end of the shaft 40 having a stepped portion 42 on which is fixed, by means of nut 44, a support plate 45 and a sprocket 46. The frame 38 defines an annular shoulder 48 which is adapted to position the shaft 40 and support the entire weight of the shaft 40.

Disposed within the frame 38 is a tubular member 50, which defines a longitudinal bore 52. The shaft 40 is disposed within the bore 52 of the tubular member 50 with the outer surface thereof in intimate relation with the inner surface of the tubular member 50. The shaft 40 is rotatable about its longitudinal axis within the tubular member 50.

The frame 38 is disposed on either end of the tubular member 50 in spaced relation with said ends. The rotative movement of the tubular member 50 about its axis relative to the frame 38 is limited by means shown in FIG. 6. A pair of external longitudinal ears 54, 56 are defined by the tubular member 50, parallel to the longitudinal axis of the shaft 40, and an internal longitudinal rib 58 is defined by the frame 38, parallel to the longitudinal axis of the shaft 40, and disposed between the ears 54, 56. Through such means, tubular member 50 is allowed a degree of movement along the longitudinal axis of the shaft 40 and relative to the shaft 40, but the rotative movement of the tubular member 50 about its axis relative to the frame 38 is limited by ears 54, 56 and rib 58. Consequently, the tubular member 50 is generally fixed in position relative to the frame 38. It will also be seen that with tubular member 50 being "free floating", none of the weight of the shaft 40 or any of the weight fixed to shaft 40 is supported by tubular member 50, but is totally supported, as described above, by frame 38.

As best shown in FIG. 7, tubular member 50 defines lateral passages 60, 62 through the body thereof, and shaft 40 defines shaft passages 64, 66. Annular passages 68, 70 are each defined between the inner surface of the tubular member 50 and the outer surface of the shaft 40. Passages 68, 70 are disposed in planes generally perpendicular to the longitudinal axis of the shaft 40.

Passage 68 is made up of (i) annular channel 72 formed in the inner surface of the tubular member 50, and (ii) annular channel 74 formed in the outer surface of the shaft 40. Likewise, passage 70 is made up of (i) annular channel 76 formed in the inner surface of the tubular member 50, and (ii) annular channel 78 formed in the outer surface of shaft 40. Passage 60 communicates with channel 72, and passage 66 communicates with channel 74, so that communication is provided between passages 60, 66 through annular passage 68. Likewise, passage 62 communicates with channel 76, and passage 64 communicates with channel 78, so that communication is provided between passages 62, 64 through annular passage 70. It will be seen that such communication between passages 62, 64, and between passages 60, 66 is provided continuously, irrespective of the rotative position of the shaft 40 relative to the tubular member 50.

Fixed to the bottom portion of shaft 40 by means of bolts 80 is hydraulic cylinder 26, as shown in FIG. 7. Suspended from the top of cylinder 26 by means of vertical links 82, 84, are jaws 86, 88 which make up the bucket 28 (FIGS. 2–5). The ends of the links 82, 84 are pivotally mounted to the top of cylinder 26.

Cross tubes 90, 92 extend across the jaws 86, 88 respectively, and are fixed thereto (FIGS. 2 and 3). Link 82 extends downwardly from the top of cylinder 26 to end in bracket portions 94, 96. Bracket portion 94 is disposed between a pair of brackets 98, 100 welded to cross tube 90, and is held there by a pin 102. Bracket portion 96 is disposed between a pair of brackets 104, 106 welded to cross tube 90, and is held there by a pin 108. A pin 110 passes through eye member 112 of piston rod 114 of cylinder 26, and through brackets 98, 104 as shown. End brackets 116, 118 are fixed to cross tube 90 adjacent its ends, and pin assemblies 120, 122 fasten end brackets 116, 118 to jaw 86. Like brackets are provided on cross tube 92 of jaw 88 and are similarly associated with the piston rod 114 of the cylinder 26. End brackets 124, 126 are fixed to cross tube 92 adjacent its ends and are pinned to end brackets 116, 118 respectively by means of pin assemblies 120, 122.

It will be seen that, as the piston rod 114 is moved outwardly of cylinder 26, or downwardly as shown in FIGS. 2, 3 and 4, the cross tubes 90, 92, and jaws 86, 88 pivot about pin assemblies 120, 122 to open as shown in FIG. 4. It will be seen that, because of this particular linking system, the links 82, 84 are nearly parallel to the cylinder 26 and piston rod 114 when jaws 86, 88 are open. This arrangement of links and pins is such to provide suitable distribution of force throughout bucket closing cycle. Since the links 82, 84 are in such position nearly parallel to the cylinder 26 and piston rod 114, the chance of bending the cylinder 26 and links 82, 84 is reduced to a minimum.

It is to be noted that the entire weight of the bucket 28 is supported by shaft 40, and that tubular member 50 does not support any of this load.

Hoses 130, 132 are associated with the tubular member 50, as best shown in FIGS. 6 and 8. The hoses 130, 132 each define an internal passage, and are associated with the tubular member by coupling means 134, 136. Since the coupling means 134, 136 of hoses 130, 132 are identical, only one will be described in detail.

A bolt 138 is threadably connected to tubular member 50 and defines a longitudinal internal passage 140 which communicates with passage 62 of tubular member 50. A tubular coupling body 142 is disposed about the bolt 138 with the inner surface of the body 142 in intimate relation with the outer surface of the bolt 138. A tubular body 142 defines a lateral body passage 144, the hose 130 end being fixed to the tubular body 142 to provide communication between the internal passage of the hose 130 and the tubular body passage 144. An annular open path 146 is defined between the inner surface of the tubular body 142 and the outer surface of the bolt 138, providing continuous communication therethrough of the tubular coupling body passage 144 and bolt passage 140, through a plurality of radial bolt passages 148. Meanwhile, a degree of movement of the tubular body 142, and the hose 130 fixed thereto, is allowed, about the longitudinal axis of the bolt 138, but still allowing such continuous communication. Such annular path 146 comprises an annular groove 150 formed in the inner surface of the tubular body 142.

Passage 66 communicates directly with a passage 160 in the head of cylinder 26 (FIG. 7), whereby passage 66 communicates directly with the head end of the cylinder 26. However, passage 64 communicates with a passage 162 in the body of the cylinder 26, which in turn communicates with valve means 164, which will now be described in detail. The valve means 164 are fixed to the head end of the cylinder 26, as shown in FIG. 7. The valve means 164 comprise a valving body 166 and a valving spool 168 associated therewith (FIG. 8). The valving body 166 defines a passage 170 which communicates with passage 162 and leads to valving spool 168. The valving spool 168 is shown in its first position in FIG. 8, which allows communication of passage 170 with a pipe 172 through a stepped portion 174 of valving spool 168. Pipe 172 communicates with the other, or rod end of the cylinder 26. However, movement of the valving spool 168 to the right to its second position will block off the passage 170, but open up the pipe 172 to a passage 176, also defined by valving body 166, which communicates with the head end of cylinder 26 through a passage 178. Resilient biasing means, comprising a helical spring 180, interposed between the valving spool 168 and valving body 166, bias the valving spool 168 in its first position.

In the operation of the system, pressure sources (not shown) are connected to hoses 130, 132. Assuming that the bucket 28 is opened, i.e., the jaws 86, 88 are apart, fluid pressure is applied to hose 130, through passages 62, 70, 64, 162, 170 and into hose 172, to act on the rod end of cylinder 26. Valving spool 168, being biased into the position shown in FIG. 8, allows such communication, but blocks off passage 176 from this pressure. Such pressure on the rod end of cylinder 26 raises the piston rod 114, closing the jaws 86, 88 as previously described. To open the jaws 86, 88, fluid pressure is applied to hose 132, through passages 60, 68, 66, 160 to the head end of the cylinder 26. The fluid pressure in the head end of cylinder 26 is also present in passage 178, and passage 176 of valve means 164. Such pressure is transferred into a pilot pressure chamber 181 by means of a pilot pressure passage 182 in valving spool 168, to shift the valving spool 168 rightward against the force of spring 180, closing off communication between pipe 172 and passage 170, and allowing communication between pipe 172 and passage 176, i.e., between the rod end of cylinder 26 and the head end thereof. As fluid enters the head end of cylinder 26, fluid is expelled from the rod end and flows into pipe 172 and passage 176. This fluid then flows across the stepped portion 174 of valving spool 168, and into the head end of cylinder 26 by way of passage 178. In this manner, the fluid being expelled from the rod end of the cylinder 26 is added to the pressurized fluid being introduced into the head end of cylinder 26 through passage 160, which establishes a supercharged condition in the head end of the cylinder 26.

This condition forces the piston rod 114 out of the cylinder 26 very rapidly, and thereby opens the bucket 28 in an extremely short period of time. Under actual test it has been found that the bucket 28 can be opened in approximately two-thirds of a second in this manner.

The spring 180 will shift the valving spool 168 back to its rest position as soon as pressure in the head end of cylinder 26 and passages 176 and 178 is relieved. Since the valving means 164 are connected directly to the top portion of cylinder 26, response to the increased volume of fluid into the cylinder 26 is extremely rapid and no additional lines or hoses are needed.

It should be noticed that, while such operations are going on, the bucket 28, through the pivoting of shaft 40, is freely pivotable through 360° without the hindrance of hoses, etc. This is because of the novel swivel joint assembly 24 system described above. In addition, the coupling means 134, 136, provide a degree of pivoting of hoses 130, 132 relative to the swivel joint assembly 24 itself, allowing for even freer and more convenient use of the apparatus.

As shown in FIGS. 2 and 4, stop means, comprising stop members 200, 202 are associated with jaws 86, 88, respectively. Stop members 200, 202 are positioned to contact each other to limit the opening movement of the jaws 86, 88 (FIG. 4). The stop members 200, 202 actually comprise extended portions of jaws 86, 88 respectively, with end portions that define flat surfaces 204, 206 which contact each other across the full flat surface of each to limit opening movement of the jaws 86, 88. Such positive stop means serve also to protect the links 82, 84 and cylinder 26 and piston rod 114 thereof, since there is no danger of the jaws 86, 88 contacting them upon the sudden opening of the jaws 86, 88.

Such positive stop means have the additional advantage that, in combination with the quick opening provided by the valve means 164, the sudden positive stop of the opening jaws 86, 88 acts to clean the jaws 86, 88, resulting in more efficient use.

A cushioned stop 210 is fixed to the trunnion support assembly 22, as best shown in FIGS. 2, 4 and 5. The cushioned stop 210 is positioned to contact the stick arm 12 if the bucket assembly 10 should pendulate in a wide arc toward the stick arm 12 (FIG. 2). In such situations, the cushioned stop 210 would absorb the force of the bucket assembly 10, and prevent it from striking the stick arm 12.

With particular reference to FIGS. 5 and 7 of the drawings, an optional bucket rotating assembly 220 is shown for providing powered rotation of the bucket assembly 10. The powered rotating assembly 220 includes a hydraulic motor 222, sprocket 46, and a chain 224. A sprocket 226 secured to the shaft 228 of the hydraulic motor 222 drives the chain 224 and thereby rotates the sprocket 46. The sprocket 46 is secured to the stepped portion 42 of shaft 40 by a key 230. It can be seen therefore that rotation of the sprocket 46 by the chain 224 will cause shaft 40 of the swivel joint assembly 24 to rotate also. Thus, the entire bucket assembly 10 below the joint frame 38 rotates with shaft 40. Even without the powered rotating assembly 220, the entire bucket assembly 10 can be rotated by hand in view of the construction of the swivel joint assembly 24.

What is claimed is:

1. A joint assembly comprising: a tubular member generally fixed in position and defining a longitudinal bore and a lateral tubular member passage through the body thereof; a longitudinal shaft disposed within the bore of the tubular member with the outer surface thereof in intimate relation with the inner surface of the tubular member and rotatable about its longitudinal axis within the tubular member, and defining through the shaft body a shaft passage; and, an annular passage defined between the inner surface of the tubular member and the outer surface of the shaft, providing continuous communication therethrough of the tubular member passage and the shaft passage, irrespective of the rotative position of the shaft relative to the tubular member, wherein the tubular member defines through the tubular member body thereof a second lateral tubular member passage, the shaft defining through the shaft body thereof a second shaft passage, and further comprising a second annular passage defined between the inner surface of the tubular member and the outer surface of the shaft, providing continuous communication therethrough of the second tubular member passage and second shaft passage, irrespective of the rotative position of the shaft relative to the tubular member, wherein the first-mentioned and second annular passages are each disposed in planes generally perpendicular to the longitudinal axis of the shaft, and wherein are further included a fixed frame associated with the joint assembly for generally fixing the tubular member in position relative to the frame, wherein the first and second annular passages comprise annular channels formed in the inner surface of the tubular member, wherein the first and second annular passages further comprise annular channels formed in the outer surface of the shaft, wherein the frame is disposed on either end of the tubular member to allow a degree of movement of the tubular member along the longitudinal axis of the shaft, and relative to the shaft, and further including means for limiting rotative movement of the tubular member about its axis relative to the frame, meanwhile allowing said degree of movement of the tubular member along the longitudinal axis of the shaft and relative to the shaft.

2. The joint assembly according to claim 1 wherein the frame is configured to position the shaft therein and to totally support the weight of the shaft, with none of the weight of the shaft being supported by the tubular member.

3. The joint assembly according to claim 2 wherein the means for limiting rotative movement of the tubular member about its axis relative to the frame, meanwhile allowing a degree of movement of the tubular member along the longitudinal axis of the shaft and relative to the shaft, comprise a pair of external longitudinal ears defined by the tubular member, parallel to the longitudinal axis of the shaft, and an internal longitudinal rib defined by the frame and parallel to the longitudinal axis of the shaft, and disposed between the ears.

* * * * *